Oct. 29, 1957   H. L. DAVIS ET AL   2,811,090
ENCLOSURE DEPRESSURIZATION RATE CONTROL
Filed Sept. 1, 1955
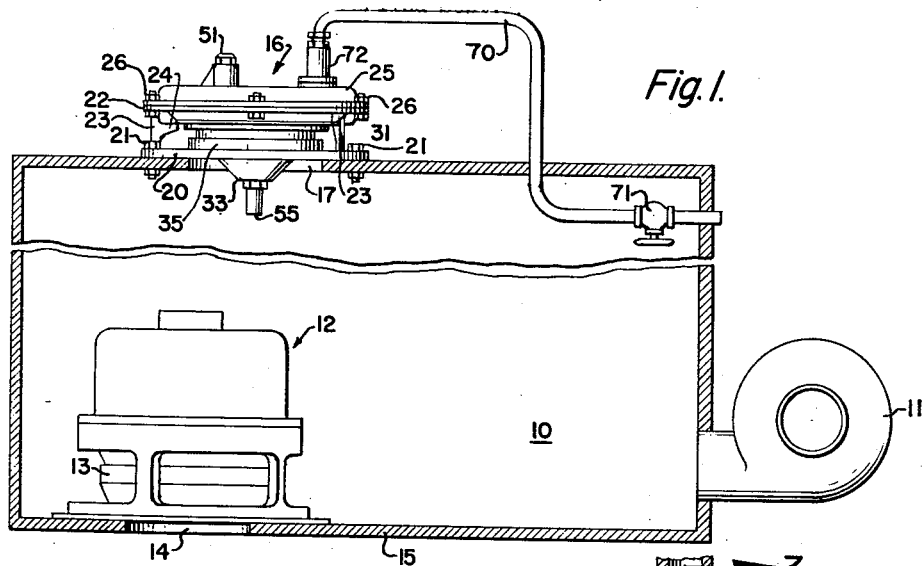
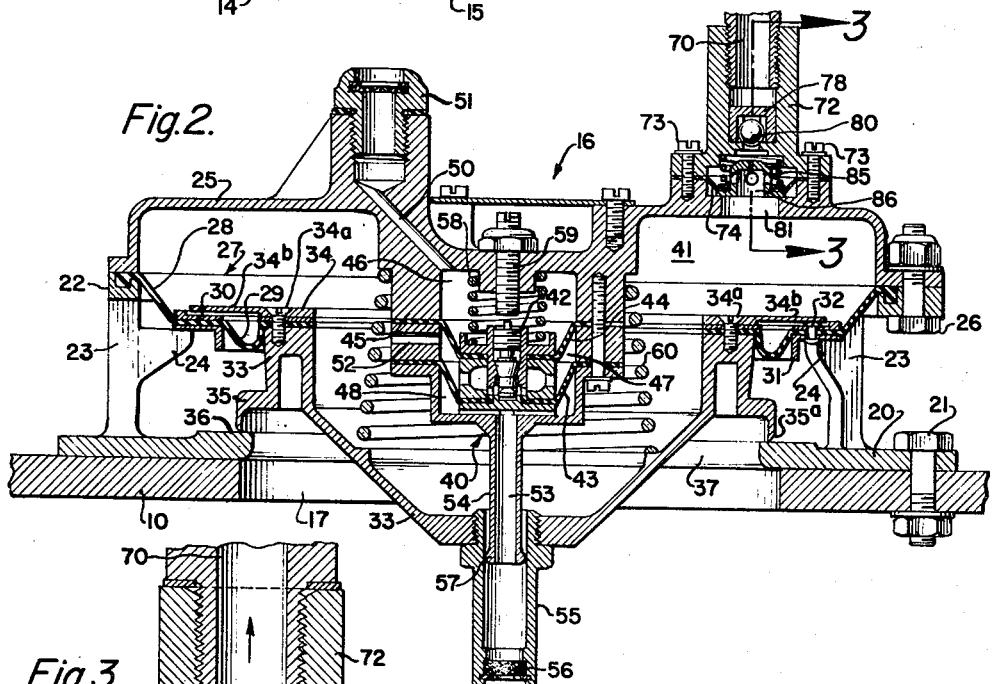
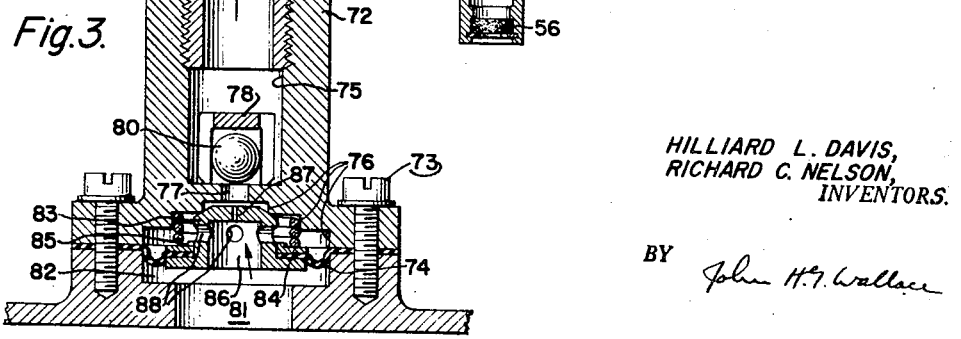
HILLIARD L. DAVIS,
RICHARD C. NELSON,
         INVENTORS.
BY John H. Wallace

United States Patent Office 2,811,090
Patented Oct. 29, 1957

2,811,090

ENCLOSURE DEPRESSURIZATION RATE CONTROL

Hilliard L. Davis, Pacoima, and Richard C. Nelson, Los Angeles, Calif., assignors to The Garrett Corporation, Los Angeles, Calif., a corporation of California Application September 1, 1955, Serial No. 532,025

11 Claims. (Cl. 98—1.5)

This invention relates generally to pressure control mechanism, and relates more particularly to mechanism of this character for controlling the rate of depressurization of a pressurized enclosure.

While the invention has particular utility in connection with pressurized ventilation of aircraft cabins and the like, and is hereinafter shown and described as embodied in such a conditioning system, it is to be understood that its utility is not limited thereto.

Generally, in aircraft pressurizing and ventilating systems, a supercharger or the like is provided for continuously supplying air under pressure to the cabin or enclosure, and the pressure within the enclosure is maintained, in accordance with a predetermined pressure schedule, by a pressure regulator which controls the flow of air through an outflow valve disposed in an opening in the wall of the enclosure. In addition to the pressure regulator and outflow valve, it is customary to provide an auxiliary safety valve which will assume control of the enclosure pressure under certain transient conditions. This auxiliary safety valve generally combines in one structure the functions of a positive pressure relief valve for automatically venting cabin air to atmosphere when the differential between the pressure in the enclosure and the surrounding atmospheric pressure approaches the unsafe structural limits of the aircraft, a negative pressure relief valve for automatically allowing the enclosure pressure to equalize with atmospheric pressure when such atmospheric pressure becomes greater than that of the enclosure, and a dump valve for selective manual equalization of enclosure pressure with atmospheric at the will of the pilot. The safety valve of the present invention accomplishes the three relief functions described above.

It has been the general practice when utilizing the safety valve as a dump valve for equalizing enclosure pressure with atmospheric pressure to fully open the outflow valve of the safety valve and quickly lower the enclosure pressure to the level of the atmospheric pressure. In such a system, however, the resultant rapid change in enclosure pressure may cause extreme discomfort or serious injury to the pilot and passengers.

In both commercial and military aircraft, the safety and comfort of the occupants are of primary consideration, and it is, therefore, an object of the present invention to provide a safety valve of the above described type having means to prevent an excessively rapid change in enclosure pressure when utilizing the safety valve as a dump valve for equalizing enclosure pressure with atmospheric pressure.

Another object of the invention is to provide means of this character which will limit and control the rate of pressure change in the enclosure.

Still another object of the invention is to provide means of this character that are relatively simple in construction and reliable in operation.

A further object of the invention is to provide a safety valve of the above described type having a novel pilot valve for effecting regulation of the pressure in the chamber within the positive pressure relief range of valve function.

Other and further important objects of the present invention will become apparent from the disclosures in the following detailed specification, appended claims and accompanying drawing, wherein:

Fig. 1 is a schematic illustration of a pressurized enclosure employing a safety valve and the depressurization rate control according to the present invention;

Fig. 2 is an enlarged sectional view of a safety valve incorporating the depressurization rate control of the present invention; and Fig. 3 is a further enlarged fragmentary sectional view showing details of the depressurization rate control with components thereof in different positions.

Referring to the drawing, there is shown an enclosure 10, such as an aircraft cabin, which is continuously supplied with air under pressure by means of a blower or supercharger 11 operated by any suitable source of power, not shown. The air pressure within the enclosure 10 is maintained in accordance with a predetermined pressure schedule by a pressure regulator, indicated generally at 12, having a valve member 13 which controls the outflow of enclosure air through an outlet 14 in a wall 15 of the enclosure 10.

A safety valve, indicated generally at 16, is shown as mounted on the outside of the enclosure 10 over a port 17 in a wall thereof. The safety valve 16 may, for example, be of the type disclosed in U. S. Patent No. 2,641,985, or in U. S. Patent No. 2,641,986. It is to be understood, however, that the depressurization rate control of the present invention may be employed in connection with other types of pneumatically operated valves arrangements without departing from the spirit and scope of the present invention.

In the embodiment of the invention shown in the drawing, the valve 16 includes a base structure 20 which may be secured to the enclosure 10 by bolts 21, or by any other suitable means. A ring 22 is integrally supported in spaced relationship to the base structure 20 by means of a plurality of webs or struts 23 each of which have inwardly projecting lugs 24. A cover member 25 is secured to the ring 22 by means of bolts 26, there being a movable wall in the form of a flexible diaphragm, indicated generally at 27, clamped at its outer periphery between the ring 22 and the cover 25. The diaphragm 27 comprises a single annular flexible diaphragm and is divided into an actuating outer annular portion 28 and a balanced inner annular portion 29, the outer and inner portions being separated by a non-flexible annular ring 30 and a non-flexible ring shaped member 31 that are clamped to the diaphragm by means of rivets 32. Movement of the ring 30 and the ring shaped member 31, and of the diaphragm portion 28, in a downward direction is arrested when the member 31 comes to rest on the lugs 24 of the struts 23. The diaphragm portion 29 is clamped at its inner periphery between a valve member 33 and a clamping ring 34 by a plurality of screws 34a. A plurality of non-flexible fingers 34b are rigidly fixed to the ring 34 and extend over the annular ring 30 so that an upward movement of the ring 30 will contact the fingers 34b and raise the valve member 33.

The valve member 33 is provided with an annular valve portion 35, having a knife-edge seating rim 35a that is adapted to engage an annular valve seat 36 formed on the base structure 20. An opening 37 in the base structure 20, co-axially located and communicating with the port 17 in the wall of the enclosure 10, is provided for the passage of air when the valve member 33 is open.

A pilot valve, indicated generally at 40, is positioned within a control chamber 41 defined by the cover 25, diaphragm 27, and valve member 33. The pilot valve 40 includes a valve 42 that is affixed to the central portions of a pair of diaphragms 43 and 44. The diaphragms 43 and 44 are fixedly supported at their outer periphery by an inwardly extending boss 45 and form movable walls for a plurality of chambers 46, 47, and 48. The chamber 46 is vented to ambient atmosphere by means of a passage 50 and a fitting 51. The chamber 47 communicates with the control chamber 41 by means of a passage 52, and the chamber 48 is in communication with the interior of the enclosure 10 by means of a passage 53 formed in a guide stem 54 which is, in turn, slidably positioned within a fitting 55. The fitting 55 is threadably disposed in the valve 33 and is provided with an opening 56 so that there is free communication between the interior of the fitting and the enclosure 10. An enlargement 57 on the outer end of the stem 54 forms a restricted passage in the fitting 55 through which air is bled into the chamber 41 from the enclosure 10.

The valve 42 constitutes a means for controlling communication between the chamber 47 and the chamber 46 thereby providing such controlled communication between the chamber 41 and the ambient atmosphere. The valve 42 is normally urged downwardly and maintained in a closed position by means of a compression spring 58 disposed in the chamber 46, but is adapted, when urged upwardly into engagement with an adjustable member 59, to open and meter air from the chamber 41 to ambient atmosphere.

When the differential between enclosure and atmospheric pressure is not greater than that for which the valve is calibrated to open, the pressure in chamber 41 is the same as enclosure pressure by virtue of the constant bleed of enclosure air past the enlargement 57 into chamber 41, and the valve member 33 is held in a closed position by a compression spring 60 disposed in the chamber 41. Enclosure pressure is also manifest in chamber 48 of the pilot valve arrangement 40, with control chamber 41 pressure being established in the chamber 47, and atmospheric pressure existing in chamber 46. Control chamber pressure between the diaphragms 43 and 44 cancels out and an enclosure to atmosphere pressure differential is sensed by the diaphragms.

When the pressure differential between the atmospheric pressure existing in chamber 46 and the enclosure pressure existing in chamber 48 is greater than the predetermined calibrated value set by the adjustable member 59, the pressure differential acting across the diaphragms 43 and 44 against the force of the spring 58 moves the diaphragms upwardly, as shown in Fig. 2, to effect contact of the operating member of the valve 42 with the adjustable member 59. This opens the valve 42 and allows air to escape from the control chamber 41 to atmosphere, or other region of lower pressure, at a greater rate than air can bleed from the enclosure into the chamber through the restricted passage at the enlargement 57. As a result, the pressure in the chamber 41 drops until enclosure pressure exerted against the valve member 33 is sufficient to overcome the combined force of spring 60 and the pressure in chamber 41 and move the valve member from its seat 36 and vent the enclosure to atmosphere.

When the pressure differential between the atmospheric pressure in chamber 46 and the enclosure pressure in chamber 48 drops to a value equal to, or less than, the predetermined calibrated value set by the adjustable member 59, the force of the spring 58 will move the valve 42 downwardly so that its operating member no longer contacts the adjustable member 59 to permit air to escape from the control chamber 41 to atmosphere. Due to the bleeding of enclosure air into the chamber 41 through the restricted passage at the enlargement 57, the pressure in the chamber 41 builds up until it reaches enclosure pressure. Chamber air pressure and enclosure pressure being equalized, the spring 60 moves the valve member 33 downwardly until the knife edge 35a of the valve portion 35 engages the seat 36 and stops the escape of air from the enclosure to atmosphere.

Should atmospheric pressure exceed enclosure pressure, and hence, the pressure in chamber 41, the differential between these pressures is applied across the diaphragm 27, causing the diaphragm, and the ring 30, to move upwardly, as viewed in Fig. 2. The ring 30 will thereupon contact the fingers 34b of the ring 34 to effect opening of the valve member 33 and admit atmospheric air into the cabin. It is to be understood, of course, that the atmospheric pressure, in order to effect opening of the valve, must increase a sufficient amount above cabin pressure so as to overcome the force of the spring 60, said spring, however, being relatively light. As enclosure pressure, and hence, pressure in chamber 41, equalizes with atmospheric pressure, the spring 60 will move the valve member 33, the fingers 34b, and the ring 30, downwardly to return the ring 30 to rest on the lugs 24 and effect closing of the valve member 33.

It often becomes desirable to manually dump the enclosure air to atmosphere in order to equalize enclosure and ambient atmospheric pressures. To accomplish this, the chamber 41 is bled to atmosphere through a conduit or passageway 70, which interconnects the chamber 41 with ambient atmosphere. A portion of the conduit 70 extends through the enclosure 10 and has a shut-off valve 71 positioned therein, which may be actuated manually, or by other means well known to the art. The valve 71 may be termed a primary valve and may, for example, be under the direct control of the pilot of an aircraft.

The conduit 70 threadably engages a fitting 72 that is connected to the cover 25 by means of a plurality of screws 73. A diaphragm 74 has its outer peripheral portion clamped between the fitting 72 and the cover 25. As shown in Figs. 2 and 3, the fitting 72 has, at one end, an elongated bore 75 extending a portion of the way therethrough, and, at the other end, a series of stepped concentric bores 76. A reduced diameter opening 77 communicates between the bore 75 and the smallest of the bores 76.

A check valve retainer 78 is positioned in the inner end of the bore 75 and retained therein as by a press fit. The retainer 78 encloses a ball check valve 80 that is adapted for co-operation with the opening 77. The check valve, thus formed by the retainer 78, ball check valve 80 and opening 77, may be termed a secondary valve and is adapted to permit flow only outwardly from the chamber 41.

The cover 25 is provided with an opening 81, the outer end of which is counter-bored as at 82 to a diameter substantially identical to the largest of the stepped bores 76. The diaphragm 74 extends into the space defined by the counter-bore 82 and adjacent bore 76. A valve 83 is affixed to the central portion of the diaphragm 74 by means of a retainer 84 that is secured in position by means of a forced fit about the periphery of the valve 83. The valve 83 is provided with a beveled outer end, that is adapted for cooperation with the outer end of the smallest of the bores 76, and is urged in a direction away from this outer end by means of a compression spring 85 disposed between the fitting 72 and the retainer 84. A central recess 86 has an orifice 87 extending axially from the inner end of the recess to the outer surface of the valve. A plurality of radially extending openings 88 communicate between the recess 86 and the outer annularly extending surface of the valve 83.

Normally the valve 71 is closed and the valve 83 is retained in the position shown in Fig. 2 by the force of the compression spring 85. When it is desired to equalize enclosure and ambient atmospheric pressures, the valve 71 is opened. Opening the valve 71 will reduce the pressure in the conduit 70, and the ball check valve member 80 will be raised from its seat on the opening 77, thereby to lower the pressure within the area of the stepped bores 76. The change in pressure differential created across the diaphragm 74 will cause this diaphragm, together with the valve 83, to move to the position shown in Fig. 3, thereby to seat the valve 83 on the outer end of the smallest of the bores 76. In this condition, fluid flow from the chamber 41 will be by way of the opening 81 in the cover 25, recess 86 in the valve 83, orifice 87, through the opening 77, bore 75 and conduit 70 to atmosphere. When a predetermined lower pressure differential level is established, due to reduction in pressure in the chamber 41 and across the diaphragm 74, the force of the spring 85 will move the valve 83 downwardly toward the position shown in Fig. 2. Fluid flow from the chamber 41 will, thereafter, be by way of opening 81, recess 86, radially directed opening 88 in the valve 83, openings 77, bore 75, and conduit 70 to atmosphere.

Thus, it may be seen that, when the valve 71 is opened, the change in pressure differential created across the diaphragm 74 will cause the valve 83 to seat on the outer end of the smallest of the bores 76, and the rate of pressure change in the valve 41 will be established at the predetermined rate by the flow through the orifice 87. As the differential between pressure in chamber 41 and the ambient atmosphere decreases, and the flow through orifice 87 tends to decrease, the pressure differential across the diaphragm 74 will also decrease, and the valve 83 will be moved downward by the force of the spring 85 to permit additional flow from chamber 41 through the openings 88 to maintain a constant rate of pressure change in chamber 41. By maintaining the predetermined rate of change in chamber 41, the opening movement of the valve member 33 will be controlled to cause enclosure pressure to decrease at the predetermined rate. When the pressure in chamber 41 is approximately equal to ambient atmospheric pressure, the valve 83 will be in the position shown in Fig. 2, and there will be unrestricted communication between the chamber 41 and ambient atmosphere.

Upon manual closing of the valve 71, the outward flow from the chamber 41 will terminate, the pressure in the chamber 41 will build up and close the valve member 33 in the manner heretofore explained, and the enclosure may thereafter be repressurized. It is customary that the rate of repressurization of the enclosure be controlled by means of the enclosure pressure regulator 12 to maintain the necessary safety and comfort of the enclosure occupants.

We claim:

1. A positive relief and dump valve for providing efflux of air from a pressurized enclosure having an opening communicating with ambient atmospheric pressure, comprising: a control chamber; a movable wall including a flexible diaphragm and a valve member forming one side of the control chamber, the valve member controlling communication through the enclosure opening; restricted inlet passage means providing communication between the pressurized enclosure and the control chamber; an outlet providing communication between the control chamber and the ambient atmosphere; means responsive at all times to the differential of pressure between that in the enclosure and ambient atmosphere and adapted, when the differential of pressure tends to exceed a predetermined value, to control the flow of fluid from the control chamber through the outlet to ambient atmosphere in order to maintain the predetermined differential between enclosure pressure and ambient atmospheric pressure; conduit means for venting the control chamber to ambient atmosphere; a normally closed shut-off valve in the conduit means; and rate of pressure change control means adapted to establish a predetermined rate of pressure reduction within the control chamber when the shut-off valve is opened to vent the control chamber air through the conduit means to ambient atmosphere.

2. A positive relief and dump valve for providing efflux of air from a pressurized enclosure having an opening communicating with ambient atmospheric pressure, comprising: a control chamber; a movable wall including a flexible diaphragm and a valve member forming one side of the control chamber, the valve member controlling communication through the enclosure opening; restricted inlet passage means providing communication between the pressurized enclosure and the control chamber; an outlet providing communication between the control chamber and the ambient atmosphere; pilot valve means including a valve and diaphragm means responsive at all times to the differential of pressure between that in the enclosure and ambient atmosphere and adapted, when the differential of pressure tends to exceed a predetermined value, to open the valve to control the flow of fluid from the control chamber through the outlet to ambient atmosphere in order to maintain the predetermined differential between enclosure pressure and ambient atmospheric pressure; means for normally maintaining the valve of the pilot valve means in closed position; conduit means for venting the control chamber to ambient atmosphere; a normally closed shut-off valve in the conduit means; and rate of pressure change control means adapted to establish a predetermined rate of pressure reduction within the control chamber when the shut-off valve is opened to vent the control chamber air through the conduit means to ambient atmosphere.

3. A positive relief and dump valve for providing efflux of air from a pressurized enclosure having an opening communicating with ambient atmospheric pressure, comprising: a control chamber; a movable wall including a flexible diaphragm and a valve member forming one side of the control chamber, the valve member controlling communication through the enclosure opening; restricted inlet passage means providing communication between the pressurized enclosure and the control chamber; an outlet providing communication between the control chamber and the ambient atmosphere; pilot valve means including a valve and diaphragm means responsive at all times to the differential of pressure between that in the enclosure and ambient atmosphere and adapted, when the differential of pressure tends to exceed a predetermined value, to open the valve to control the flow of fluid from the control chamber through the outlet to ambient atmosphere in order to maintain the predetermined differential between enclosure pressure and ambient atmospheric pressure; means normally maintaining the valve of the pilot valve means in closed position; conduit means for venting the control chamber to ambient atmosphere; a normally closed shut-off valve in the conduit means; and rate of pressure change control means including a valve and diaphragm means subjected on one side to the pressure in the control chamber and adapted, when the shut-off valve is opened to vent the control chamber air through the conduit means to ambient atmosphere, to establish a predetermined rate of pressure reduction within the control chamber.

4. A positive relief and dump valve for providing efflux of air from a pressurized enclosure having an opening communicating with ambient atmospheric pressure, comprising: a control chamber; a movable wall including a flexible diaphragm and a valve member forming one side of the control chamber, the valve member controlling communication through the enclosure opening; restricted inlet passage means providing communication between the pressurized enclosure and the control chamber; an outlet providing communication between the control chamber and the ambient atmosphere; pilot valve means including a valve and diaphragm means responsive at all times to the differential of pressure between that in the enclosure and ambient atmosphere and adapted, when the differential of pressure tends to exceed a predetermined value, to open the valve to control the flow of fluid from the control chamber through the outlet to ambient atmosphere in order to maintain the predetermined differential between enclosure pressure and ambient atmospheric pressure; means normally maintaining the valve of the pilot valve means in closed position; conduit means for venting the control chamber to ambient atmosphere; a normally closed shut-off valve in the conduit means; and rate of pressure change control means including a spring-biased diaphragm actuated valve subjected on one side to the pressure in the control chamber and adapted, when the shut-off valve is opened to vent the control chamber air through the conduit means to ambient atmosphere, to establish a predetermined rate of pressure reduction within the control chamber.

5. A positive relief and dump valve for providing efflux of air from a pressurized enclosure having an opening communicating with ambient atmospheric pressure, comprising: a control chamber; a movable wall including a flexible diaphragm and a valve member forming one side of the control chamber, the valve member controlling communication through the enclosure opening; restricted inlet passage means providing communication between the pressurized enclosure and the control chamber; an outlet providing communication between the control chamber and the ambient atmosphere; pilot valve means including a valve and diaphragm means responsive at all times to the differential of pressure between that in the enclosure and ambient atmosphere and adapted, when the differential of pressure tends to exceed a predetermined value, to open the valve to control the flow of fluid from the control chamber through the outlet to ambient atmosphere in order to maintain the predetermined differential between enclosure pressure and ambient atmospheric pressure; means normally maintaining the valve of the pilot valve means in closed position; conduit means for venting the control chamber to ambient atmosphere; a normally closed shut-off valve in the conduit means; and rate of pressure change control means including a spring-biased valve and diaphragm means responsive to the differential of pressure on opposite sides thereof and adapted, when the shut-off valve is opened to vent the control chamber air through the conduit means to ambient atmosphere, to control the flow of air from the control chamber so as to establish a predetermined rate of pressure reduction within the control chamber.

6. A positive relief and dump valve for providing efflux of air from a pressurized enclosure having an opening communicating with ambient atmospheric pressure, comprising: a control chamber; a movable wall including a flexible diaphragm and a valve member forming one side of the control chamber, the valve member controlling communication through the enclosure opening; restricted inlet passage means providing communication between the pressurized enclosure and the control chamber; an outlet providing communication between the control chamber and the ambient atmosphere; pilot valve means including a valve and diaphragm means responsive at all times to the differential of pressure between that in the enclosure and ambient atmosphere and adapted, when the differential of pressure tends to exceed a predetermined value, to open the valve to control the flow of fluid from the control chamber through the outlet to ambient atmosphere in order to maintain the predetermined differential between enclosure pressure and ambient atmospheric pressure; means normally maintaining the valve of the pilot valve means in closed position; conduit means for venting the control chamber to ambient atmosphere; a normally closed shut-off valve in the conduit means; the rate of pressure change control means including a spring-biased valve and diaphragm means responsive to the differential of pressure on opposite sides thereof, the valve having a plurality of orifices arranged to control the flow of air from the control chamber, when the shut-off valve is opened to vent the control chamber air through the conduit means to ambient atmosphere, so as to establish a predetermined rate of pressure reduction within the control chamber.

7. A positive relief and dump valve for providing efflux of air from a pressurized enclosure having an opening communicating with ambient atmospheric pressure, comprising: a control chamber; a movable wall including a flexible diaphragm and a valve member forming one side of the control chamber, the valve member controlling communication through the enclosure opening; restricted inlet passage means providing communication between the pressurized enclosure and the control chamber; an outlet providing communication between the control chamber and the ambient atmosphere; pilot valve means including a valve and diaphragm means responsive at all times to the differential of pressure between that in the enclosure and ambient atmosphere and adapted, when the differential of pressure tends to exceed a predetermined value, to open the valve to control the flow of fluid from the control chamber through the outlet to ambient atmosphere in order to maintain the predetermined differential between enclosure pressure and ambient atmospheric pressure; means normally maintaining the valve of the pilot valve means in closed position; conduit means for venting the control chamber to ambient atmosphere; primary valve means in the conduit means; secondary valve means in the conduit means, the secondary valve means including a check valve for permitting fluid flow only outward from the control chamber; and rate of pressure change control means including a spring-biased valve and diaphragm means responsive to the differential of pressure on opposite sides thereof, the valve having a plurality of orifices arranged to control the flow of air from the control chamber past the primary and secondary valve means, when the primary valve means is opened to vent the control chamber air through the conduit means to ambient atmosphere, in order to establish a predetermined rate of pressure reduction within the control chamber.

8. A positive pressure relief, negative pressure relief, and dump valve adapted for mounting externally of a pressurized enclosure having an opening communicating with ambient atmospheric pressure, comprising: a control chamber; a movable wall including a flexible diaphragm and a valve member forming one side of the control chamber, the valve member controlling communication through the enclosure opening; means dividing the flexible diaphragm into an inner portion and an outer portion; stop means for arresting movement of the outer portion of the flexible diaphragm outwardly from the control chamber, the stop means allowing inward movement of the outer portion of the flexible diaphragm into the control chamber; means providing restricted communication between the pressurized enclosure and the control chamber; pilot valve means including a valve and diaphragm means responsive at all times to the differential of pressure between that in the enclosure and ambient atmosphere and adapted, when the differential of pressure tends to exceed a predetermined value, to control communication between the control chamber and ambient atmosphere; means normally maintaining the valve of the pilot valve means in closed position; conduit means leading from the control chamber to ambient atmosphere; a normally closed shut-off valve in the conduit means; and rate of pressure change control means adapted to establish a predetermined rate of pressure reduction within the control chamber when the shut-off valve is opened to vent the control chamber air through the conduit means to ambient atmosphere.

9. A positive pressure relief, negative pressure relief, and dump valve adapted for mounting externally of a pressurized enclosure having an opening communicating with ambient atmospheric pressure, comprising: a control chamber; a movable wall including a flexible diaphragm and a valve member forming one side of the control chamber, the valve member controlling communication through the enclosure opening; yielding means urging the valve member in the closing direction; means dividing the flexible diaphragm into an inner portion and an outer portion; stop means for arresting movement of the outer portion of the flexible diaphragm outwardly from the control chamber, the stop means allowing inward movement of the outer portion of the flexible diaphragm into the control chamber; means providing restricted communication between the pressurized enclosure and the control chamber; an outlet providing communication between the control chamber and the ambient atmosphere; pilot valve means including a valve and diaphragm means responsive at all times to the differential of pressure between that in the enclosure and ambient atmosphere and adapted, when the differential of pressure tends to exceed a predetermined value, to open the valve to control the flow of fluid from the control chamber through the outlet to ambient atmosphere in order to maintain the predetermined differential between enclosure pressure and ambient atmospheric pressure; means normally maintaining the valve of the pilot valve means in closed position; conduit means leading from the control chamber to ambient atmosphere; primary valve means in the conduit means; secondary valve means in the conduit means, the secondary valve means including a check valve for permitting fluid flow only outward from the control chamber; and rate of pressure change control means including a spring-biased valve and diaphragm means responsive to the differential of pressure on opposite sides thereof, the valve having a plurality of orifices arranged to control the flow of air from the control chamber past the primary and secondary valve means, when the primary valve means are opened to vent the control chamber air through the conduit means to ambient atmosphere, in order to establish a predetermined rate of pressure reduction within the control chamber.

10. A pressure relief valve for a pressurized enclosure having an opening communicating with ambient atmospheric pressure, comprising: a control chamber; a movable wall including a flexible diaphragm member and a valve member forming one side of the control chamber, the valve member controlling communication through the enclosure opening; restricted inlet passage means providing communication between the pressurized enclosure and the control chamber; control means within the control chamber including a pilot valve affixed to a diaphragm means, the diaphragm means dividing the control means into a first chamber having outlet passage means communicating with the ambient atmosphere and a second chamber having passage means communicating with the enclosure and being adapted to move the pilot valve toward the open position, when the differential between the ambient atmospheric pressure and the enclosure pressure acting on the diaphragm means tends to exceed a predetermined value, to controllably permit fluid to flow from the control chamber through the first chamber to ambient atmosphere to maintain the predetermined differential between enclosure pressure and ambient atmospheric pressure; and means for normally maintaining the pilot valve in the closed position.

11. A pressure relief valve for a pressurized enclosure having an opening communicating with ambient atmospheric pressure, comprising: a control chamber; a movable wall including a flexible diaphragm member and a valve member forming one side of the control chamber, the valve member controlling communication through the enclosure opening; restricted inlet passage means providing communication between the pressurized enclosure and the control chamber; control means within the control chamber including a pilot valve and a plurality of diaphragms, the diaphragms dividing the control means into a first chamber having outlet passage means communicating with the ambient atmosphere, a second chamber having passage means communicating with the control chamber, and a third chamber having passage means communicating with the enclosure, the diaphragms being adapted, when the differential between ambient atmospheric pressure in the first chamber and enclosure pressure in the third chamber tends to exceed a predetermined value, to move the pilot valve toward the open position to controllably permit fluid to flow from the control chamber through the second chamber to the first chamber and thence to ambient atmosphere to maintain the predetermined differential between enclosure pressure and ambient atmospheric pressure; and means for normally maintaining the pilot valve in the closed position.

References Cited in the file of this patent

UNITED STATES PATENTS

| | | |
|---|---|---|
| 2,463,487 | Widgery et al. | Mar. 1, 1949 |
| 2,466,465 | Morris | Apr. 5, 1949 |
| 2,578,026 | Taylor | Dec. 11, 1951 |
| 2,641,985 | Jensen | June 16, 1953 |
| 2,641,986 | Arthur | June 16, 1953 |
| 2,672,086 | Jensen | Nov. 16, 1954 |